(12) United States Patent
Detoumay et al.

(10) Patent No.: US 6,294,235 B1
(45) Date of Patent: Sep. 25, 2001

(54) AUTOMOBILE FUEL TANK

(75) Inventors: Patrick Detoumay, Dion-Valmont; Claude Delahaut, Bouffioulx, both of (BE)

(73) Assignee: Fina Research, S.A., Feluy (BE)

( * ) Notice: Subject to any disclaimer, the term of this patent is extended or adjusted under 35 U.S.C. 154(b) by 0 days.

(21) Appl. No.: 09/597,383

(22) Filed: Jun. 19, 2000

(30) Foreign Application Priority Data

Jun. 25, 1999 (EP) .................................................. 99112255

(51) Int. Cl.$^7$ ............................ B65D 88/12; B65D 88/22
(52) U.S. Cl. ........................ 428/35.7; 428/36.7; 428/36.8; 428/36.92
(58) Field of Search ................................ 428/35.7, 36.92, 428/36.7, 36.8

(56) References Cited

U.S. PATENT DOCUMENTS 4,719,135 * 1/1988 Gerdes et al. .......................... 428/35
5,384,172 * 1/1995 Takado et al. ...................... 428/35.7

* cited by examiner

*Primary Examiner*—Harold Pyon
*Assistant Examiner*—Sandra M. Nolan
(74) *Attorney, Agent, or Firm*—Jim D. Wheelington

(57) ABSTRACT

A blow moulded automobile fuel tank having a wall defining a fuel chamber wherein the minimum wall thickness of the wall is from 2.4 mm to less than 3 mm, the tank being composed of a high density polyethylene having a density of from 0.945 to 0.955 g/cm$^3$, a high load melt index of from 5 to 9.5 g/10 min, the high density polyethylene optionally having a carbon black content of up to 0.5 wt %, and the fuel tank having a fire resistance and an impact resistance both complying with the respective standards defined in ECE 34, ANNEX 5.

6 Claims, 1 Drawing Sheet

AUTOMOBILE FUEL TANK

BACKGROUND TO THE INVENTION

The present invention relates to a blow moulded automobile fuel tank composed of high density polyethylene.

DESCRIPTION OF THE PRIOR ART

Such fuel tanks are required to exhibit high safety performance, particularly with regard to fire resistance and impact resistance. Plastics automobile fuel tanks are required to meet minimum statutory and industry specified performance criteria both with respect to creep resistance when the tank is subjected to a fire and crash test resistance when the tank is subjected to an impact. Known blow moulded automobile fuel tanks suffer from the disadvantage that in order to meet the specified criteria the fuel tanks are required by automobile manufacturers to have a minimum wall thickness of at least 3 mm so as to provide sufficient impact strength and creep resistance for the fuel tank as a whole. However, the use of such high wall thicknesses leads to a number of disadvantages. First the high wall thickness increases the weight of the fuel tank, although there is a general desirability to reduce the weight of automobile components. Second, the high wall thickness increases the amount of plastics material employed to produce a fuel tank of a given volume, thereby increasing the material cost of the fuel tank. Finally, the high wall thickness increases the moulding time of the plastics fuel tank, thereby increasing the production cost.

U.S. Pat. No. 4,719,135 discloses a fuel tank having a polymer substrate, e.g. of HDPE, coated with a particular cured varnish agent. The tank is blow moulded. The HDPE has a density of from 0.935 to 0.950 g/cm$^3$ and an HLMI of less than about 10 g/10 min.

DE-A-3435992 discloses an extrusion blown fuel tank of HDPE, the HDPE also having a density of from 0.935 to 0.950 g/cm$^3$ and an HLMI of less than about 10 g/10 min.

WO-A-91/09732 discloses a multi-layer container for use as a fuel tank having an interlayer of highly sulphonated high density polyethylene. The tank is blow moulded. A central interlayer is provided between inner and outer layers of HDPE each of thickness 1.5 to 5 mm. It is stated that with a thickness less than 1.5 mm the inner and outer layers do not provide the multi-layer container with sufficient mechanical strength and impact resistance.

SUMMARY OF THE INVENTION

It is an aim of the present invention at least partially to overcome these disadvantages of known fuel tanks.

It is also an aim of the invention to provide a blow moulded automobile fuel tank which may have a lower weight than those using high density polyethylene of standard fuel tank grades yet still meeting stringent industry test specifications, in particular with regard to fire resistance and impact resistance.

Accordingly, the present invention provides a blow moulded automobile fuel tank having a wall defining a fuel chamber wherein the minimum wall thickness of the wall is from 2.4 mm to less than 3 mm, the tank being composed of a high density polyethylene having a density of from 0.945 to 0.955 g/cm$^3$ and a high load melt index of from 5 to 9.5 g/10 min, the high density polyethylene optionally having a carbon black content of up to 0.5 wt %, and the fuel tank having a fire resistance and an impact resistance both complying with the respective standards defined in ECE 34, ANNEX 5.

Preferably, the density is around 0.95 g/cm$^3$. In this specification, the density is measured at 23° C. using the procedures of ASTM D 1505.

Preferably, the high load melt index is around 8 g/10 min. In this specification, the high load melt index is measured using the procedures of ASTM D 1238 at 190° C. using a load of 21.6 kg.

The preferred high density polyethylene has a stress crack resistance (F50) measured in accordance with the procedures of ASTM D 1693 of greater than 360 hours. The preferred high density polyethylene has a flexural modulus measured in accordance with the procedures of ISO 178 at a temperature of 23° C. of 1100 MPa. The preferred high density polyethylene has a stress and an elongation at yield of 25 MPa and 11% respectively, both measured in accordance with the procedures of ISO 527.

The preferred high density polyethylene is produced by a low pressure slurry loop polymerisation process. Typically, the catalyst is a chromium-based catalyst incorporating titanium and having a pore volume of from 1.0 to 3 cm$^3$/g and a specific surface area of from 350 to 700 m$^2$/g. The preferred chromium-based catalyst may be obtained by deposition of chromium onto a support matrix comprising a blend of silica and titania; the co-deposition of chromium and titanium compounds onto a silica support-matrix; the deposition of a titanium compound onto a support matrix comprising a blend of chromia and silica; or the terprecipitation of silicon, titanium and chromium compounds.

DETAILED DESCRIPTION OF THE PREFERRED EMBODIMENT

Figure 1:
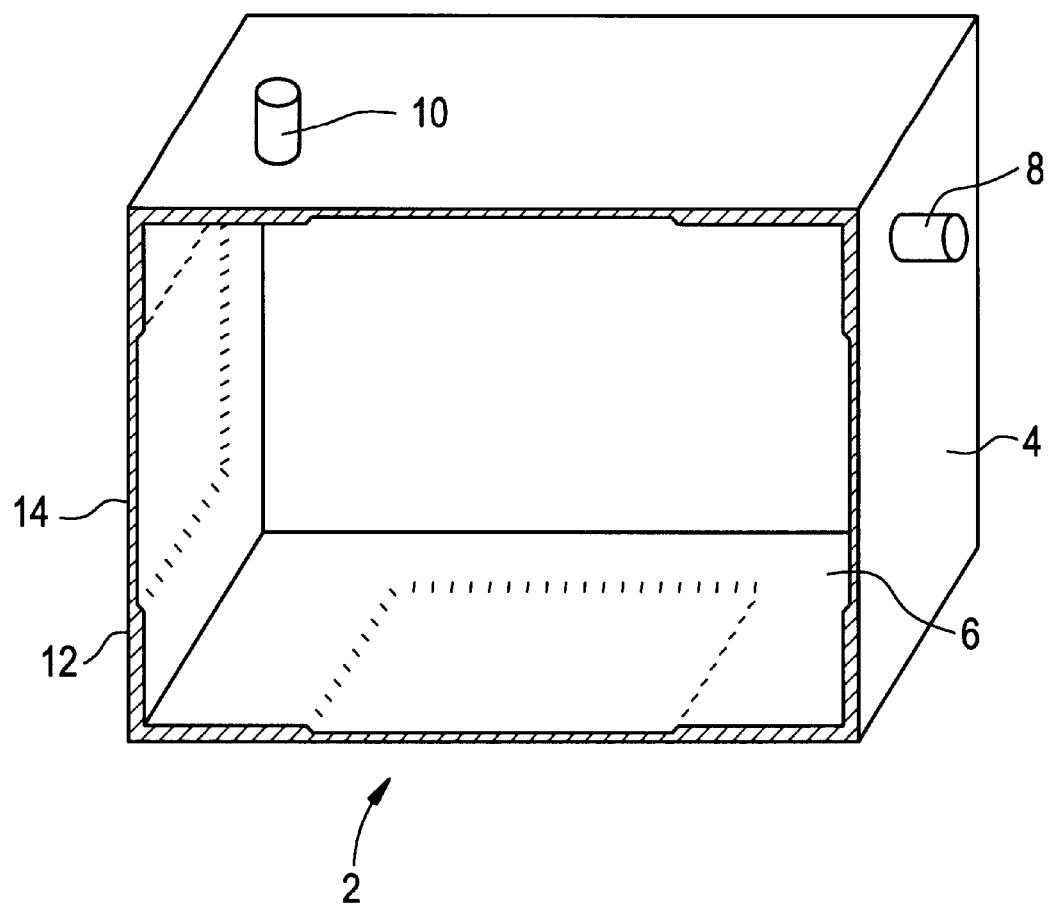
FIG. 1 is a schematic sectional view of a blow moulded automobile fuel tank in accordance with a first embodiment of the present invention.

FIG. 1 shows, as a schematic representation, an automobile fuel tank, designated generally as 2, which has been blow moulded. The fuel tank has a wall 4 defining a fuel chamber 6. The thickness of the wall is exaggerated in FIG. 1 for the purpose of clarity of illustration. The fuel tank has an inlet 8 for fuel and an outlet 10 for fuel. The wall 4 of the fuel tank 2 varies in thickness so as to ensure that the fuel tank has the requisite mechanical properties, in particular impact resistance and fire resistance, yet with a minimum amount of material so as to minimise material costs and weight of the fuel tank 2. Accordingly, some portions 12 of the wall 4 are relatively thick where local reinforcement is required, and other portions 14 of the wall are relatively thin where local reinforcement is not required. At the relatively thin portions 14, the minimum wall thickness of the wall 4 is from 2.4 mm to less than 3 mm. The wall 4 is composed of a high density polyethylene having a density of from 0.945 to 0.955 g/cm$^3$ and a high load melt index of from 5 to 9.5 g/10 min, more preferably from 6 to 9.5 g/10 min, most particularly around 8 g/10 min. More preferably, the high density polyethylene has a density of from 0.947 to 0.955 g/cm$^3$, most preferably around 0.95 g/cm$^3$. The minimum wall thickness most preferably is from 2.4 mm to 2.7 mm.

The present inventors have found surprisingly that the use of a high density polyethylene having a density of from 0.945 to 0.955 g/cm$^3$, preferably 0.947 to 0.955 g/cm$^3$, and a high load melt index of from 5 to 9.5 g/10 min, preferably 6 to 9.5 g/10 min, for the manufacture of blow moulded automobile fuel tanks enables the fuel tank not only to have a fire resistance and an impact resistance complying with the specified industry standards defined in ECE 34, ANNEX 5, but also surprisingly to have wall thicknesses which are less than the 3 mm threshold which, prior to the present invention, was required by automobile manufacturers as an absolute minimum wall thickness to enable the required properties of the fuel tank to be achieved. Thus the present inventors have overcome a technical prejudice present in the art which specified a minimum wall thickness for the fuel tank of at least 3 mm.

In overcoming this technical prejudice, the present inventors have enabled a fuel tank to be produced which, by having a reduced wall thickness, in particular having a wall thickness which may be as low as from 2.4 mm to less than 3 mm, maintains the structural integrity of the fuel tank whereby the fuel tank maintains compliance with statutory and industry-specified fire and impact safety standards, yet achieves weight savings of around 10% or even greater over known high density polyethylenes employed in conjunction with minimum wall thicknesses of at least 3 mm. The minimum wall thickness may range from 2.4 mm to 2.7 mm. This provides specific technical advantages with regard to weight reduction of the automobile component, reduced material costs, reduced recycling costs, energy saving in production of the fuel tank, and faster blow moulding cycle times, without compromising the impact resistance and fire resistance of the fuel tank.

The fire resistance standard defined in ECE 34, ANNEX 5, briefly requires the fuel tank to resist an open/semi open fire for two minutes. A blow moulded fuel tank produced in accordance with the invention exceeded this requirement, in particular by providing enhanced creep resistance at elevated temperature. Briefly, the impact resistance standard defined in ECE 34, ANNEX 5 requires the tank to be filled with ethylene glycol and subjected to cold impact at a temperature of −40° C. A fuel tank produced in accordance with the invention was deformed but did not split open when subjected to that impact test.

What is claimed is:

1. An impact and fire resistant blow molded automobile fuel tank having a wall defining a fuel chamber which wall varies in thickness wherein the minimum wall in one or more portions of the wall is from 2.4 mm to less than 3 mm, the tank being composed of a high density polyethylene having a density of from 0.945 to 0.955 g/cm$^3$ and a high load melt index of from 5 to 9.5 g/10 min, the high density polyethylene optionally having a carbon black content of up to 0.5 wt %, and the fuel tank meets fire resistance and impact resistance standards in ECE 34, Annex 5, such that it resists an open/semi open fire for two minutes and, when filled with ethylene glycol and subjected to impact at −40° C., does not split open.

2. A blow moulded automobile fuel tank according to claim 1 wherein the high density polyethylene has a high load melt index of from 6 to 9.5 g/10 min.

3. A blow moulded automobile fuel tank according to claim 2 wherein the high density polyethylene has a high load melt index of around 8 g/10 min.

4. A blow moulded automobile fuel tank according to claim 1 wherein the high density polyethylene has a density of from 0.947 to 0.955 g/cm$^3$.

5. A blow moulded automobile fuel tank according to claim 4 wherein the high density polyethylene has a density of around 0.95 g/cm$^3$.

6. A blow moulded automobile fuel tank according to claim 1 wherein the minimum wall thickness is from 2.4 mm to 2.7 mm.

* * * * *